(12) United States Patent
Redden

(10) Patent No.: US 11,570,420 B2
(45) Date of Patent: Jan. 31, 2023

(54) PLANT FEATURE DETECTION USING CAPTURED IMAGES

(71) Applicant: Blue River Technology Inc., Sunnyvale, CA (US)

(72) Inventor: Lee Kamp Redden, Palo Alto, CA (US)

(73) Assignee: Blue River Technology Inc., Sunnyvale, CA (US)

( * ) Notice: Subject to any disclaimer, the term of this patent is extended or adjusted under 35 U.S.C. 154(b) by 0 days.

(21) Appl. No.: 17/853,925

(22) Filed: Jun. 30, 2022

(65) Prior Publication Data

US 2022/0360758 A1 Nov. 10, 2022

Related U.S. Application Data

(63) Continuation of application No. 17/012,055, filed on Sep. 4, 2020, now Pat. No. 11,423,354, which is a
(Continued)

(51) Int. Cl.

| | |
|---|---|
| *H04N 13/204* | (2018.01) |
| *G06K 9/62* | (2022.01) |
| *H04N 13/128* | (2018.01) |
| *H04N 13/239* | (2018.01) |
| *H04N 13/271* | (2018.01) |

(Continued)

(52) U.S. Cl.
CPC ......... *H04N 13/204* (2018.05); *G06K 9/6277* (2013.01); *G06T 7/593* (2017.01); *G06V 20/38* (2022.01); *H04N 13/128* (2018.05); *H04N 13/239* (2018.05); *H04N 13/243* (2018.05); *H04N 13/271* (2018.05); *G06T 2207/10021* (2013.01); *G06T 2207/20076* (2013.01); *G06T 2207/20081* (2013.01); *G06T 2207/30252* (2013.01); *G06V 2201/12* (2022.01);
(Continued)

(58) Field of Classification Search
CPC .. H04N 13/204; H04N 13/128; H04N 13/271; H04N 13/239; H04N 13/243; H04N 2013/0081; H04N 2013/0092; G06T 7/593; G06T 2207/10021; G06T 2207/20076; G06T 2207/20081; G06T 2207/30252; G06V 20/38; G06V 2201/12; G06K 9/6277
See application file for complete search history.

(56) References Cited

U.S. PATENT DOCUMENTS 10,255,670 B1 * 4/2019 Wu .................. H04N 7/183
11,069,082 B1 * 7/2021 Ebrahimi Afrouzi ..... G06T 7/70
(Continued)

*Primary Examiner* — Pinalben Patel
(74) *Attorney, Agent, or Firm* — Fenwick & West LLP

(57) ABSTRACT

Described are methods for identifying the in-field positions of plant features on a plant by plant basis. These positions are determined based on images captured as a vehicle (e.g., tractor, sprayer, etc.) including one or more cameras travels through the field along a row of crops. The in-field positions of the plant features are useful for a variety of purposes including, for example, generating three-dimensional data models of plants growing in the field, assessing plant growth and phenotypic features, determining what kinds of treatments to apply including both where to apply the treatments and how much, determining whether to remove weeds or other undesirable plants, and so on.

20 Claims, 9 Drawing Sheets

Related U.S. Application Data continuation of application No. 16/569,649, filed on Sep. 12, 2019, now Pat. No. 10,812,776, which is a continuation of application No. 15/407,644, filed on Jan. 17, 2017, now Pat. No. 10,491,879.

(60) Provisional application No. 62/279,599, filed on Jan. 15, 2016.

(51) Int. Cl.
  *H04N 13/243* (2018.01)
  *G06V 20/00* (2022.01)
  *G06T 7/593* (2017.01)
  *H04N 13/00* (2018.01)

(52) U.S. Cl.
  CPC ............... *H04N 2013/0081* (2013.01); *H04N 2013/0092* (2013.01)

(56) References Cited

U.S. PATENT DOCUMENTS

| | | | |
|---|---|---|---|
| 11,315,258 B1 * | 4/2022 | Anagnostopoulos | ... G06T 7/246 |
| 2021/0192211 A1 * | 6/2021 | Sibley | ................. A01B 69/001 |

* cited by examiner

PLANT FEATURE DETECTION USING CAPTURED IMAGES

CROSS REFERENCE TO RELATED APPLICATIONS

This application is a continuation of U.S. patent application Ser. No. 17/012,055 filed Sep. 4, 2020, now U.S. Pat. No. 11,425,354, which is a continuation of U.S. patent application Ser. No. 16/569,649 filed Sep. 12, 2019, now U.S. Pat. No. 10,812,776, which is a continuation of U.S. patent application Ser. No. 15/407,644, filed on Jan. 17, 2017, now U.S. Pat. No. 10,491,879, which claims the benefit of and priority to U.S. Provisional Application 62/279,599, filed Jan. 15, 2016, all of these applications are incorporated by reference in its entirety for all purposes.

STATEMENT REGARDING FEDERALLY SPONSORED RESEARCH OR DEVELOPMENT

This invention was made with government support under Phase II SBIR contract NSF #1256596 with the National Science Foundation. The government has certain rights in the invention.

BACKGROUND

This description relates generally to precision agriculture, and more specifically to techniques for generating virtual data models of plants captured by images.

Identifying plants from captured images is beneficial for a number of agricultural purposes. However, individual plants are generally planted close in proximity to each other in order to maximize a desired outcome (e.g., maximize yield, protein percentage, or some other measurable quantity) while minimizing the amount of land that is needed to grow the crops. Based on this, it is common for the leaves, branches, and other growths of a plant to overlap with other nearby plants. As these growths are usually both numerous and roughly similar in appearance from plant to plant, existing image recognition systems experience difficulty when trying to identify plant matter than may appear to belong to multiple nearly overlapping plants. Often, they will mischaracterize plant growths as belonging to the wrong plant, or will misidentify how many plants are present in the field.

SUMMARY

Several techniques for identifying the presence and locations in three-dimensional space of features of individual plants are provided. In one example embodiment, a sequence of stereo image pairs that have been captured as a device passes along a row of crops in a field are captured, where the images of each stereo pair each capture at least a portion of one or more of the crops of the row. A plurality of probability heatmaps are generated, each probability heatmap corresponding to one of the images from each stereo image pair, the probability heatmaps comprising probabilities that points within the images contain an occurrence of a plant feature. Additionally, a plurality of depth maps are generated, each depth map corresponding to one of the stereo image pairs, each depth map associating points in the images of the stereo image pairs with points in three-dimensional space. The probability heatmaps and the depth maps are combined to generate a combined map for each stereo image pair in the sequence. Further, a plurality of transformation matrices are generated to transform between each pair of sequential depth maps. A plurality of clusters of points are generated based on the combined maps and the transformation matrices, each cluster comprising a plurality of points located in sufficient proximity to each other in three-dimensional space, the points of the cluster having sufficiently high probabilities of the occurrence of the plant feature. The occurrence of the plant feature is identified based on the plurality of clusters.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

Described are methods for identifying the in-field positions of unique plant features, that is, an externally visible physical characteristic of a plant that a plant only has one of, examples of which include but are not limited to a stalk, a location of where the stalk is planted in the ground, a flower, a trunk, an ear, a meristem, etc. These positions are determined based on images captured as a vehicle (e.g., tractor, sprayer, etc.) including one or more cameras travels through the field along a row of crops. The in-field positions of the unique plant features are useful for a variety of purposes including, for example, generating three-dimensional data models of plants growing in the field, assessing plant growth and phenotypic features, determining what kinds of treatments to apply including both where to apply the treatments and how much, determining whether to remove weeds or other undesirable plants, and so on. Knowing the position in the field of unique plant features is useful generally because it provides a starting point for performing any of the above listed processes and more on a plant-by-plant basis.

More generally, the processes and uses described here in relation to unique features also equally applicable for identifying the in-field positions of plant features that are not necessarily unique, that is, externally visible physical characteristics of a plant that a plant may have more than one of, examples of which include but are not limited to leaves, stems, nodes, branches, points where branches split, bulbs, flowers, squares, bolls, fruits, etc.

II. Operating Environment

Figure 1:
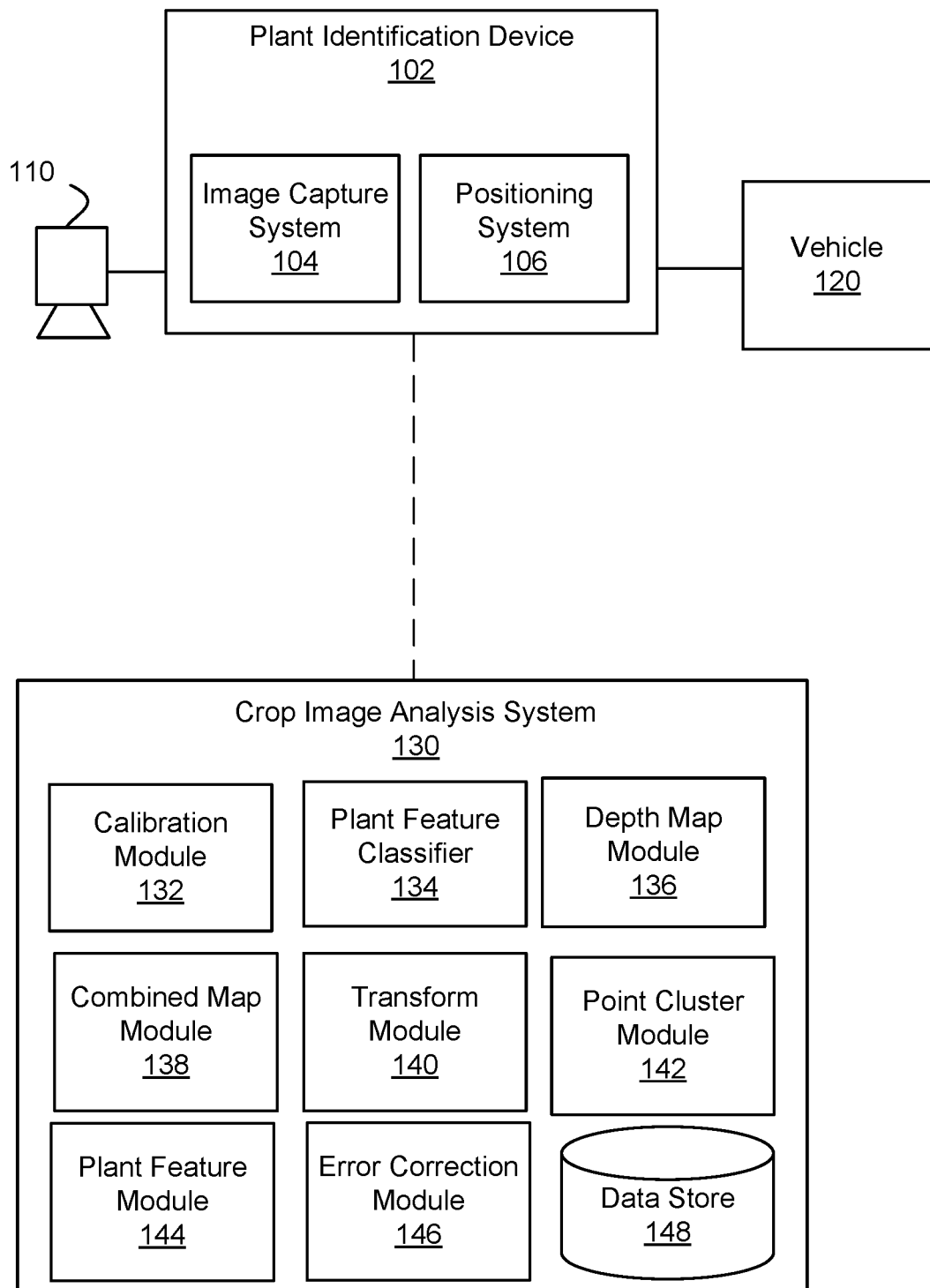
FIG. 1 is a block diagram of an environment in which captured images can be used to identify plant features, according to one embodiment.

FIG. 1 is a block diagram of a combined system 100 for capturing images that can be used to identify plant features, according to one embodiment. In this example, plant identification device 102 is either a part of, or is physically connected to a vehicle 120 travelling through a field, such as a tractor, truck, or any other vehicle. A drone may also be used in place of a vehicle. One or more cameras 110 associated with the device 102 capture images of crops being grown in the field. The plant identification device 102 includes an image capture module 104 and a positioning system 106.

The cameras 110 may be any type of camera capable of capturing images in either visible or near-infrared spectrum. Generally, the cameras 110 capture data in a digital format where image data is stored at the granularity of pixels or subpixels. The cameras 110 are affixed to the device 102 so as to be relatively close to the crops themselves when the images are captured. In one example embodiment, the approximate distance between the cameras and plants is on the order of 1-100 inches, a specific example of which is 12 inches. The cameras 110 may include fisheye lenses so that they are each able to capture light over a very wide angle. This allow a single image captured by a camera 110 to capture not only a plant directly in front of the camera 110, but also plants located adjacent to the center plant along the row the vehicle 120 is traveling, something that would not be possible with a lens with a narrower field of view given the short distance between the cameras 110 and the crops.

The image capture system 104 includes logic for communicating with the camera/s 110 to initiate image capture, receive image data, perform any desired processing on it, and communicate it to the crop image analysis system 130. The image capture system 104 may be embodied as computer program software instructions running on computer hardware (e.g., processor, memory, etc.) present on device 102, or it may be dedicated computing hardware (e.g., a field programmable gate array (FPGA)) designed to carry out these processes. This hardware may be shared in common with the positioning system 106, or it may be dedicated and independent hardware included in device 102 to carry out these tasks.

The positioning system 106 includes logic for determining the real-world position of the device 102. This may include global positioning, which may, for example, be provided by a global positioning system (GPS). Global positioning information includes position information at a first scale, and would inform which field, among many, device 102 is located in, and a first order approximation of where the device 102 is within the field, such as which row of crops.

The positioning system 106 also includes logic for determining real-world position at a second scale smaller than the first, that is on the order of (approximately) individual centimeters rather than meters. This "local" position information provides specific information of exactly where a device 102 is in a field, and particularly the relative distance between individual plants in the field (identified, for example, based on the techniques described herein) and individual physical components on the device 102, such as the camera 110, sprayers, plant removal devices, etc. This precise position is useful for a variety of purposes, including, for example knowing when to spray a chemical stored on the vehicle 120 once a plant has been identified by the system. Like the image capture system 104, the positioning system 106 may be embodied as computer program software instructions running on computer hardware (e.g., processor, memory, etc.) present on device 102, or it may be dedicated computing hardware (e.g., a field programmable gate array (FPGA) designed to carry out these processes). This hardware may be shared in common with the image capture system 104, or it may be dedicated and independent hardware included in device 102 to carry out these tasks.

The crop image analysis system 130 receives position and image information from the device 102, analyses it, and stores it for later use depending upon how the information is going to be used. The positions of plant features identified by system 130 can be used in a variety of different processes as mentioned above, some of which involve using the analyses provided by system 130 to carry out some action on device 102, such as the activation of a sprayer. The explicit uses and components of device 102 to carry out these tasks are omitted for brevity.

Depending upon the implementation, system 130 may either be a part of the device 102, such as part of a computer physically mounted within device 102, or it may be a separate computer system communicatively coupled to the device 102, for example via a CAN bus, a short range wireless network (e.g., Bluetooth), a long range wireless network (e.g., WiFi), etc.

System 130 may be embodied as computer program software instructions running on computer hardware (e.g., processor, memory, etc.) on device 102, or it may be dedicated computing hardware itself (e.g., a field programmable gate array (FPGA). This hardware may be shared in common with systems 104 and 106, particularly if they are all co-located on device 102, or it may be implemented with its own dedicated and independent hardware.

Two different implementations of the crop image analysis system 130 are described in sections III and IV. The first implementation discussed in section III is described with respect to FIG. 1-5B. The second implementation discussed in section IV is described with respect to FIG. 6-8, with reference made to some modules described earlier to avoid repetition. Although these implementations illustrate some example embodiments of the inventive concept, the inventive concept is not limited to these embodiments, and in practice other embodiments of the inventive concept may use alternative techniques to identify the locations of plant features, or may generate combined maps that provide the locations of these features according to different techniques.

III. Crop Image Analysis System—Classifier Implementation

Figure 2:
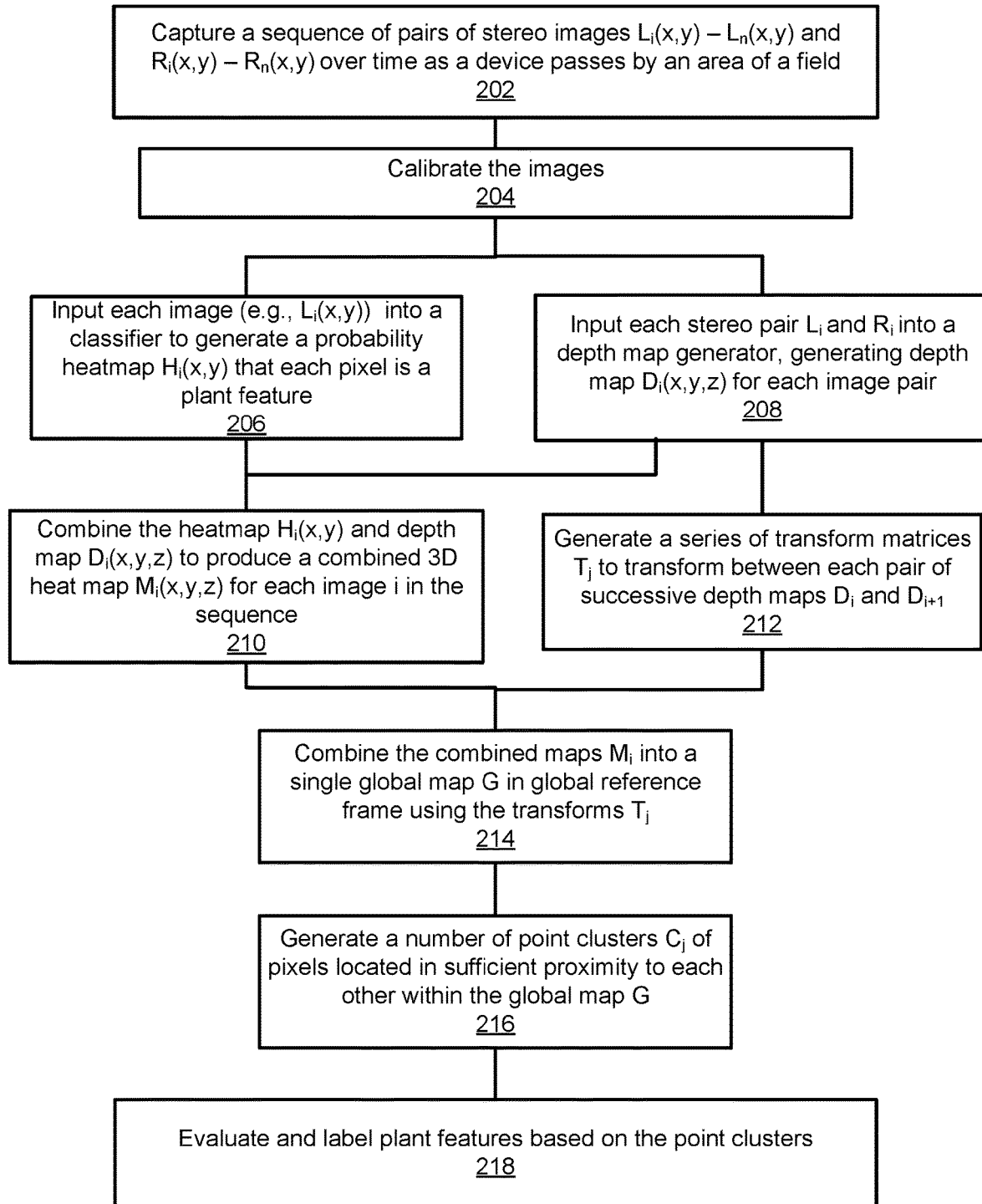
FIG. 2 is an example process for using captured images to create combined maps that provides both depth and likelihood estimations for plant features at pixels in the captured images, according to one embodiment.
Figure 3:
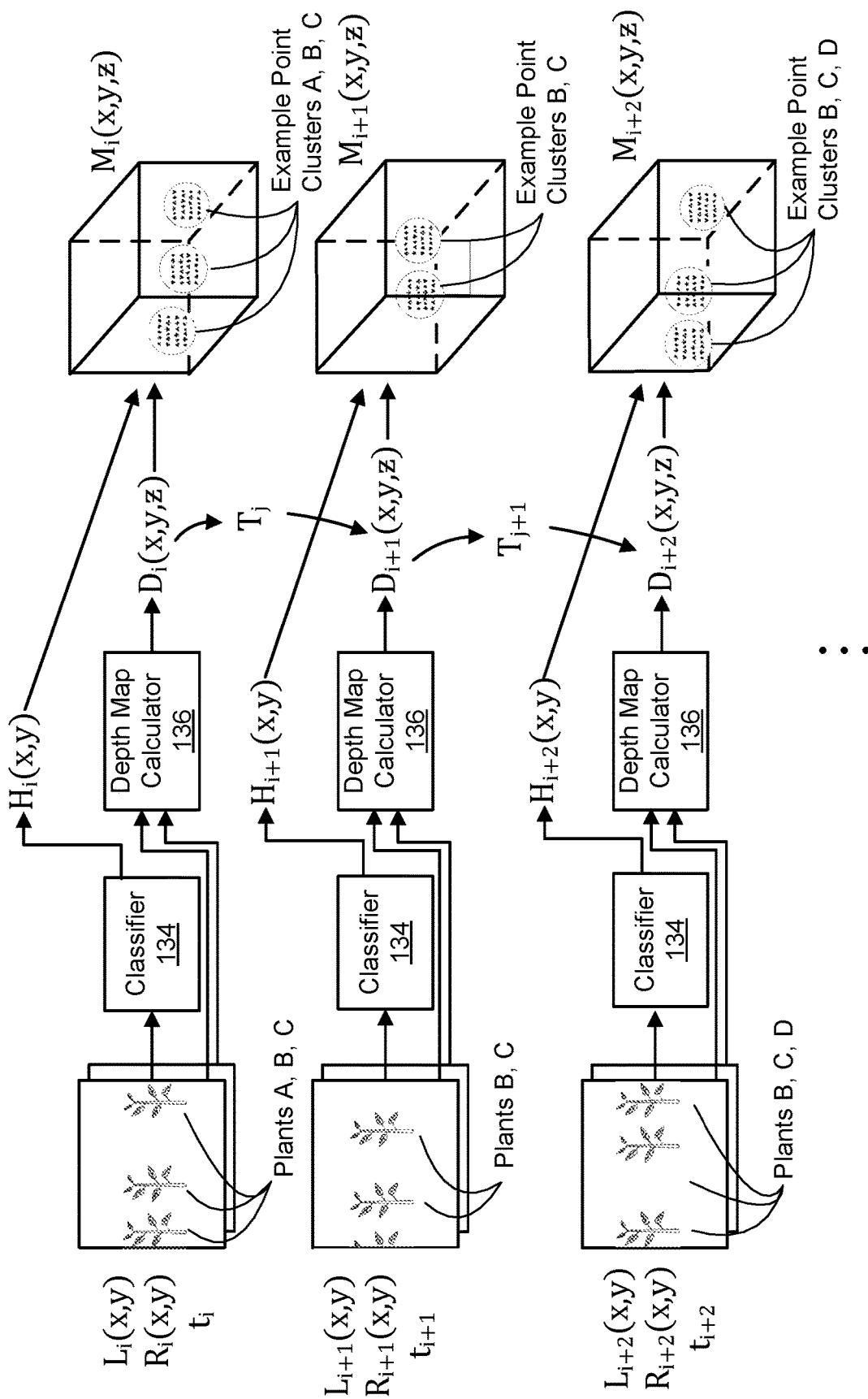
FIG. 3 is an example block diagram illustrating the process for creating the combined maps, according to the example process described in FIG. 2.

Crop image analysis system 130 includes a calibration module 132, a plant feature classifier 134, a depth map module 136, a heatmap module 138, a transform module 140, a point cluster module 142, a plant feature module 144, an error correction module 146, and a data store 148. The modules within system 130 are described below with respect to FIGS. 1-3 together. Specifically, FIG. 2 is an example process for using captured images to create heatmaps that provides both depth and likelihood estimations for plant features at pixels in the captured images, according to one embodiment. FIG. 3 is an example block diagram illustrating the process for creating the heatmaps, according to the example process described in FIG. 2.

III.A. Image Receipt and Correction

The crop image analysis system 130 receives 202 a sequence of pairs of stereo images captured over time as device 102 passes along a row of crops in the field. For convenience, the sequence of stereo images are herein referred to as the left images $L_i(x,y)$-$L_n(x,y)$, and the right images $R_i(x,y)$-$R_n(x,y)$, captured at times $t_i$-$t_n$, where x and y are the axes of the image in the plane of the surface of the camera. Each pair of images is a stereo pair, such that the left $L_i$ and right $R_i$ image in any given pair captures largely the same image, but from different perspectives due to a difference in positioning between the capturing cameras 110. The images capture the crops in the field, as well as at least some amount of ground in which the plants are grown. The images may be captured at any angle between −90 and 90 degrees with respect to a plane parallel to the ground.

The calibration module 132 receives the images and corrects 204 the images to account for any optical effects that may otherwise obscure the substantive content of the images, and is one means for doing so. For example, if a fisheye lens was used to capture the images, the correction may include mapping the pixel data within images onto a rectilinear projection (thus, making the x and y axes linear). More generally, calibration may be performed to map the stereo images of the sequence into any other desired projection different from that used to capture the sequence initially. Other types of corrections may also be possible, for example the removal of pixels from the images that are associated with unusable data, such as pixels including unwanted reflections from light sources (e.g., a light source mounted to device 102 to illuminate the crops for image capture), pixels merely capturing dirt stuck on the lens or the external aperture (not shown) of device 102, etc.

III.B. Plant Feature Classification

The plant feature classifier 134 is a machine learning classifier that receives as input an image, and outputs 206 a heat map $H_i$ including probability values (probabilities or likelihoods) that pixels in the image are associated with the plant feature to be identified, and is one means for doing so. The heatmap $H_i$ may include a separate probability for every pixel, or for some subset thereof, such as those pixels where the probability that there is a plant feature associated with a pixel exceeds a threshold value. The plant feature classifier 134 may be generated by via any type of machine learning technique, examples of which include convolutional neural networks, random forest classifiers, support vector machines, and so on. The classifier 134 is trained in advance of being used on field images. Often, this training is supervised using test images of crops where the pixels of the plant features that the administrator wants to have the classifier identify are provided to the classifier 134 to train on. Although only one classifier 134 is described, in practice, more than one classifier 134 may be used, for example, to identify different plant features and/or the plant features of different types of plants.

In one embodiment, for a given input image $L_i(x,y)$, the classifier 134 outputs a heatmap matrix $H_i(x,y)$ of probabilities, where individual pixels in the image are associated with individual probabilities $prob_i(x_n,y_m)$ in the matrix that the corresponding pixel contains or at least partially represents the plant feature that the classifier is designed to identify, and is one means for doing so. The classifier 134 does not require stereo image pairs to operate, and thus in practice either the left images $L_i(x,y)$-$L_n(x,y)$, or the right images $R_i(x,y)$-$R_n(x,y)$ may be used to generate the heatmaps $H_i(x,y)$-$H_n(x,y)$ for the sequence of captured images, where each entry in the heatmap corresponds to the probability $prob_i(x_n,y_m)$ associated with one pixel.

In one embodiment, the pixels in the heatmaps $H_i(x,y)$-$H_n(x,y)$ are converted to voxels (voxel heatmaps), where each voxel incorporates the data of a number of nearby pixels. This has the effect of downsampling the data, reducing the volume of data that needs to be processed and stored to arrive at the identification of plant features. This also allows the voxel heatmaps to be easily combined with other voxel data later in the process.

Each voxel for the heatmap preferably represents a 2D section of virtual space or represent any other suitable unit of virtual space. The voxels can be generated by clustering points within a threshold distance of each other (e.g., within 1 millimeter, 1 centimeter, within 5 pixels, etc.) and defining a voxel about the clustered pixels, segmenting the virtual space covered by the pixels into a uniform voxel grid (e.g., wherein each voxel is substantially the same size), segmenting the virtual space covered by the pixels into a voxel grid, wherein each voxel encloses the same number of pixels (e.g., to normalize the points per area), or be generated in any other suitable manner. The voxels may also be generated using a geodesic tracing technique, pruning, or applying any other suitable downsampling method.

III.C. Depth Map Generation

The depth map module 136 receives as input a stereo pair of images $L_i(x,y)$ and $R_i(x, y)$, and outputs 208 a single depth map $D_i(x,y,z)$ where a depth value z is determined for each pixel from the left and right images, thereby representing the depth of the pixel in the original stereo images, and is one means for doing so.

More specifically, each pixel $pix_i(x_d,y_d,z_d)$ within the depth map corresponds to a pixel from each of $L_i(x_L,y_L)$ and $R_i(x_R,y_R)$, where $x_L$, $x_R$, and $x_d$ are not necessarily the same, nor are $y_L$, $y_R$, and $y_d$ necessarily the same. This difference is due to a difference in perspective between the left and right stereo images in the pair, and which provides information about the depth of each pixel along an axis perpendicular to the plane of the camera or the plane perpendicular to the direction of travel of the vehicle. Each pixel from the original images is assigned as a point in the depth map. However, not all of the three dimensional space of the depth map will be filled with points, as only a limited number of pixels are available from the original images.

In other implementations, module 136 is a point cloud module (not shown) that generates a point cloud rather than a depth map as shown and described herein. Such a point cloud module generates a three dimensional point cloud from the left and right images, where (like the depth map) points in the point cloud correspond to pixels in the underlying left and right images. These two methods of generating the points for either the depth cloud or the point cloud are interchangeable. For sake of simplicity, the following description refers to depth maps as one specific example for use in an example process, however this is not required and a point cloud module generating a point cloud could be used instead.

The depth map module 136 generates depth maps $D_i$-$D_n$ for each of the images in the sequence. The depth maps $D_i$-$D_n$ are stored in data store 148. In one embodiment, the points of the depth maps are stored as k-d trees. In one embodiment, the points in the depth maps $D_i(x,y)$-$D_n(x,y)$ are converted to voxels (voxel depth maps), where each voxel incorporates the data of a number of nearby points. This has the effect of downsampling the data, reducing the volume of data that needs to be processed and stored to arrive at the identification of plant features. This also allows the voxel depth maps to be easily combined with the voxel heatmaps described earlier.

Similarly to the above, each voxel preferably represents a volume of virtual space with a maximum density of the voxel size, but can alternatively represent a 2D section of virtual space or represent any other suitable unit of virtual space. The voxels can be generated by clustering points within a threshold distance of each other (e.g., within 1 millimeter, 1 centimeter, within 5 pixels, etc.) and defining a voxel about the clustered points, segmenting the virtual space covered by the depth map into a uniform voxel grid (e.g., wherein each voxel is substantially the same size), segmenting the virtual space covered by the depth map into a voxel grid, wherein each voxel encloses the same number of points (e.g., to normalize the points per volume between images of objects close to the camera and distal from the camera), or be generated in any other suitable manner. The depth map can be downsampled by clustering points within a threshold virtual distance together, by using a geodesic tracing technique, pruning, or applying any other suitable downsampling method.

The depth map module 136 may use a variety of different image processing techniques and/or additional sensor systems to generate the depth map $D_i$. In one embodiment, semi-global block matching is used. Other techniques may also be used for generating the depth maps, including range imaging systems such as LIDAR, time of flight systems, laser scanners, projected light systems (e.g., a system that projects a light pattern onto objects and detects deformations in the reflected light), X-rays, or any other suitable sensor system.

III.D. Combined Map Generation

The combined module 138 combines 210 each depth map $D_i$ and the corresponding heatmap $H_i$ to generate a three-dimensional combined map $M_i(x,y,z,prob)$ for each image in the sequence, where the combined map combines both depth information and the probability that each pixel from the heatmap (or point in the depth map and combined map) contains or at least partially represents the plant feature sought to be identified, and is one means for doing so. Each combined map $M_i$ uses the depth map frame of reference, such that the x and y axes for point locations are the same as those calculated for the depth map $D_i$. The probabilities from the heatmap $H_i$ are assigned to points in three dimensional space within the combined $M_i$ depending upon whether the right $R_i$ or left $L_i$ images were used to generate the heatmap $H_i$, and based on the mapping used by the depth map module 136 to map pixels from the underlying left $L_i$ or right $R_i$ image to the points of the depth map $D_i$.

Figure 4:
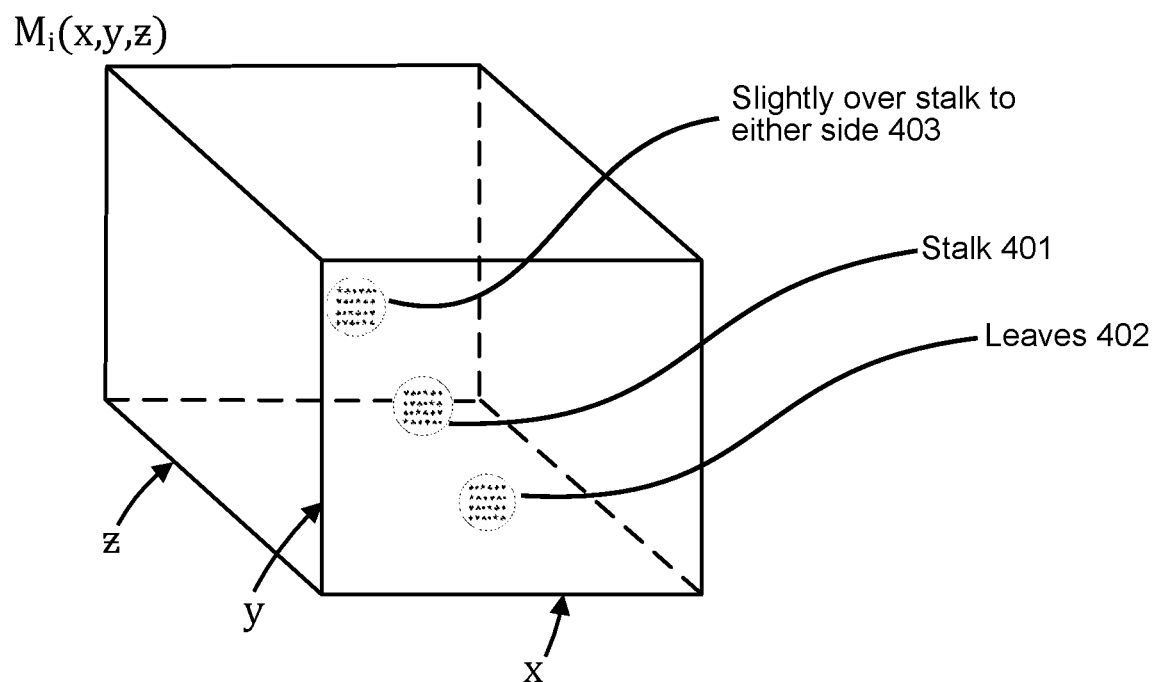
FIG. 4 is a simplified contextualization of an example combined map, according to one embodiment.

FIG. 4 is a simplified contextualization of an example combined map, according to one embodiment. This example combined map 400 is an enlargement of the example combined maps $M_i$-$M_{i+2}$ present in FIG. 3. In the example combined map 400, each point has an x/y/z position, however, only a few example points are shown. These points are denoted by symbols to illustrate that each of these points has a different associated probability prob of being associated with a plant feature based on the output of the classifier 134. As plant features are usually objects in physical space (e.g., plant stalks), it is expected that for many types of plant features, the points will be "clustered" in x/y/z space.

In practice, test data has shown that in addition to clusters associated with plant features 401 (e.g., a stalk), other clusters will appear in the data that are not associated with plant features. Often, one such cluster will appear in the foreground 402, closer to the camera 110 in the depth dimension. Generally, this cluster is created by leaves or other growths hanging off one of the plants in frame that obscures or otherwise appears to be the plant feature to the classifier 134, which cannot always distinguish between the two. Another such cluster often appears in the background 403, farther from the camera 110 in the depth dimension. Generally, this cluster is created by a part of the plant or other nearby plants that overhangs or appears to either side of the plant feature from the perspective of the camera 110, again according to the classifier 134, which cannot always distinguish these elements from the true plant feature to be identified. As will be described further below, knowledge of depth information makes it possible to remove these clusters from consideration as possible separate plant features.

In one embodiment, rather than being created in terms of pixels (of the heatmaps) and points (of the depth maps), the combined maps may be created using the voxel heatmaps and voxel depth maps. Other than this distinction, the processes carried out for generating the combined maps are the same.

For sake of clarity in this description and in the claims, the term "points," referring data entries in the depth maps, combined maps, and global map, can refer either to points associated with pixels as described above prior to the downsampling to voxels, or it can refer to points associated with the voxels of the depth maps, combined maps, and global map. Thus, the term "points" is intended to be generic with respect to exact manner in which the data is structured, stored or processed, and refers specifically to the underlying item of data that each point refers do, regardless of whether that is a location in 3D space (depth map), or a location in 3D space that has a probability associated with that location being associated with a plant feature (combined maps global map).

III.E. Transforms

The transform module 140 receives the depth maps and the left $L_i(x,y)$-$L_n(x,y)$ or right images $R_i(x, y)$, and uses them to generate 212 a series of transformation matrices $T_j$-$T_m$ (referred to as transforms), one transform $T_j$ for each pair of sequential depth maps $D_i$ and $D_{i+1}$, and is one means for doing so. Each transform $T_j$ stores the rotation and translation (i.e., three degrees of freedom) of pixels between an earlier depth map $D_i$ and the next depth map $D_{i+1}$ in the sequence. In one embodiment, each transform is represented by a 4×4 matrix, including a 3×3 rotation matrix R and a 3×1 translation matrix TL. For example, the transform may be represented as:

$$T_j = \begin{bmatrix} [R(3 \times 3)] & [TL(3 \times 1)] \\ 0\ 0\ 0 & 1 \end{bmatrix}$$

The transform module 140 maintains orthonormal bases, and consequently the transform module 140 does not handle skew or higher order degrees of freedom.

The transforms are generated by identifying the locations of image features in the each of two successive images, such as $L_i$ and $L_{i+1}$, and then using the differences in locations of the features between the images to determine the transform $T_j$ that achieves the changes in position of those features. A variety of techniques can be used for identifying image features and their locations within images including, for example, the Features from Accelerated Segment Test (FAST) algorithm for corner detection, the Simultaneous Localization and Mapping (SLAM) algorithm, the Scale-Invariant Feature Transform (SIFT) algorithm.

In an alternate embodiment, rather than determining transforms $T_j$-$T_m$ based on image information, the device 102 instead includes an inertial measurement unit (IMU) (not shown), including one or more physical or electrical sensors designed to measure one or more of Cartesian and angular translation, rotation, velocity, and acceleration. Examples of potential sensors include accelerometers and gyroscopes. Measurements of these properties at or between image captures by the camera 110 can provide data that can be used to derive the transforms, without the need for depth image calculation and analysis.

III.F. Global Frame of Reference

The combined map module 138 is further configured to use the transforms $T_j$-$T_m$ to combine 214 the maps $M_i$-$M_n$ of the sequence into a single global combined map G, that way all combined maps are located in a single global frame of reference. In this global map G, all points from the individual combined maps $M_i$ share a common set of x/y/z axes in the combined map, and each have a probability prob that that particular point in three dimensional space at least partially includes a plant feature. As a result, points from different combined maps n that, for example, identify the same plant feature will overlap or be co-located in the global map G.

Figure 5A:
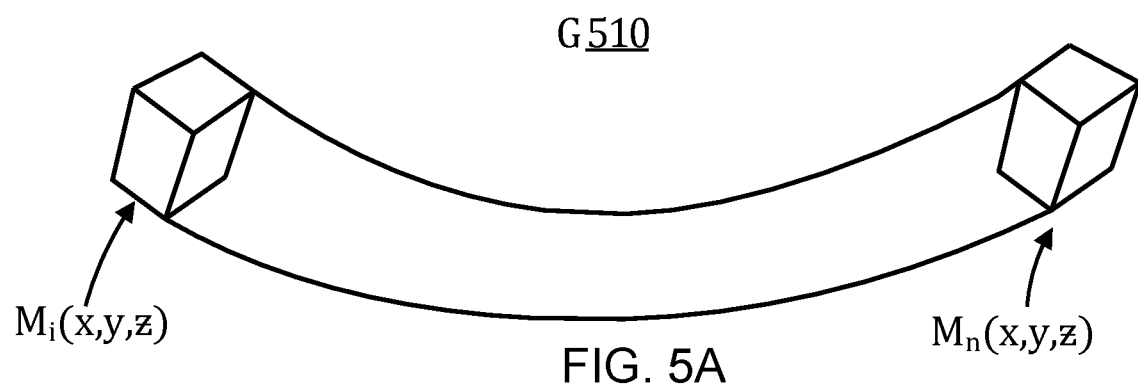
FIG. 5A illustrates an example of the how error in the transforms between different depth maps compounds across sequential depth maps and combined maps, according to one embodiment.

FIG. 5A illustrates an example a single combined map G and its constituent combined maps $M_i$-$M_n$ prior to error correction of the transforms, according to one embodiment. Error correction in the transforms is discussed below with respect to subsection III.J.

III.G. Point Cluster Generation

The point cluster module 142 receives the global map G(x,y,z,prob) and uses it to generate 216 one or more point clusters $C_j$ identifying groups (or clusters) of points within the global map G that are both in sufficient proximity to each other in three dimensional space (i.e., according to x-y-z distance) and also which have a sufficiently high probability prob of containing or at least partially representing the plant feature, and is one means for doing so. As there may be more than one plant present in the images in the sequence and therefore within the global map G, there may be many point clusters, each identifying the plant feature of a different plant.

The technique used by the point cluster module 142 to generate clusters $C_j$ may vary by embodiment. Generally, these techniques identify pixels for consideration for inclusion in a cluster for consideration either individually or in aggregate, compare their proximity (i.e., x/y/z location) within the combined map M and probability prob of representing the plant feature to that of any existing clusters $C_j$ according to a weighted function, and determine whether to add the point to one of the existing clusters or create a new cluster. Generally, the weighted function is designed such that the closer the point is in proximity to an existing cluster and the greater the probability prob, the higher the likelihood that the point will be added to the cluster. The greater the distance from the cluster and the lower the probability, the lower the likelihood the point will be added to the cluster.

In one implementation, the algorithm for assigning points to cluster is a global algorithm that assigns some or all of the points to different clusters simultaneously. Not all points necessarily need to be assigned to clusters, some points will be omitted as having too low values for prob or for being too far from other points to be grouped into clusters. The algorithm may be an iterative fit, such that the algorithm assigning points to cluster may be run once and a measure of fit of the pixel assignments to clusters may be determined, and the clustering algorithm may then be re-run using the fit information to improve the pixel assignments in the next iteration with the goal of improving the measure of fit.

Continuing the discussion above regarding points and voxels, the clustering on points within the global map M performed by the point cluster module 142 may be performed on points, regardless of whether those points are correlated with individual pixels from the original images, or whether those points are correlated with voxels generated using down sampling.

III.H. Plant Feature Identification

The plant feature module 144 accesses the clusters to identify 218 and label clusters as plant features, and is one means for doing so. Each cluster is unique from each other, and thus the plant feature module 144 labels each individual cluster differently from each other cluster. The labels may take a variety of forms, including, for example, "plant_1," "plant_2," and so on.

Additionally, depending upon the implementation, the plant feature module 144 may also delete, mark, or ignore clusters determined not to be a plant feature. The plant feature module 144 may determine that the set of clusters is merely erroneous data, or otherwise determine that the set of cluster is not sufficiently well defined so as to merit labeling as a plant feature. For example, using the example illustration of a combined map $M_i$ in FIG. 4, a first cluster 401 may be labeled as a plant feature of a plant stalk, a second cluster 402 may not be labeled as a plant feature, and may instead be dismissed as merely leaves, and a third cluster 403 may also not be labeled as a plant feature, and may instead be dismissed as merely being points that appear to obscure the plant feature from the perspective of the original two dimensional image. In contrast to the illustration, in practice such labeling will generally be performed at the global map G level rather than the combined map level as illustrated.

In practice, the plant feature module 144 may perform this analysis by analyzing the pixel density or size of the clusters, the number of pixels in each cluster, the probabilities prob of the pixels in the clusters, the location (e.g., depth) of clusters within the global map, and so on. Some of these techniques may overlap with those performed by other modules as described above. Others may be used in one module but not another, and may vary by implementation.

As a specific example, the plant feature module 144 may analyze the location of a set of clusters in terms of x/y/z position in the images in which the cluster is present, and compare those locations to other sets of clusters in other images in the sequence that have already been identified and labeled as plant features by the module 144. Generally, rows of plants are planted along a relatively straight line, and the vehicle 120 passing through the field will travel parallel to that line. Consequently, it is often the case that, depending upon the plant feature to be identified, the plant features from a row of crops will also fall along a relatively straight line down the row. For example, if the plant feature is a plant stalk, generally, the plant stalks will generally be identified as sets of point clusters located along a line in x/y/z space in the global map G.

The plant feature module 144 may be configured to use this expectation as a filter for identifying plant features. Specifically, the plant feature module 144 may remove those sets of clusters that are located sufficiently far from a line or curve fit to already-identified plant features. In an alternate implementation, the plant feature module 144 may instead retain only those sets of clusters that are located sufficiently close to the fit line or curve. Here, sufficient closeness or distance from the line or curve may be determined based on the location of the center of mass of the pixels in the cluster, which may be weighted by probability prob of the pixels, or another similar formulation.

In an alternate embodiment, separate machine learning classifier (not shown) different from module 134 may use the locations of the clusters $C_J$ to identify patches of the original left $L_i(x,y)$ and right $R_i(x, y)$ images including the points corresponding to clusters. This separately trained classifier may be used to process those patches of images to identify plant features, and label them accordingly.

III.I. Output

The plant feature module 144 stores the labels of plant features in the data store 148 along with the positions of the plant features. The position of the plant features may be stored according to a frame of reference of one of the images, a neutral frame of reference, or according to a geo-located position using external data.

Module 144 (or another module) may also store other related information, such as the clusters themselves, including the pixels that make up the clusters, their associated position and probability data, or any derived statistics such as the center of mass of the cluster. Other associated data may also be stored, such as the heatmaps and their associations with individual clusters in the set, the transforms between the heatmaps, the underlying images captured by the camera 110, as well as any other intermediate item of data. The stored data is inter-correlated, such that for any given item of data (e.g., a given cluster), it is possible to identify all other correlated data that is associated with that given item of data (e.g., correlated clusters, the heatmap in which the cluster appears, the labeled plant and plant feature the cluster corresponds to, if any, etc.). The stored data may also include vehicle 120 travel information and geospatial information, so that the sequence of images, and the associated identified plant features in those images, can be tied to a real-world location.

III.J. Transform Error Correction

FIG. 5A illustrates an example of the how error in the transforms $T_j$-$T_o$ compounds between different combined maps builds up across sequential combined maps, according to one embodiment. In practice, the camera's 110 position will be fixed, pointing in a direction that is either perpendicular or near-perpendicular to the direction of travel of the vehicle 120. Ideally, the transforms should identify translation of the objects captured in the images and present a result that the points of the depth maps merely translate or rotate between images as a result of the vehicle's 120 motion. Consequently, ideally the pixels of the depth maps would not shift in between images in directions the vehicle is not moving.

In practice however, the transforms $T_j$-$T_o$ will often appear to show that the combined maps $M_i$-$M_n$ curve in one direction or another, often in the depth dimension, as if the vehicle 120 were turning while driving through the field. This error is due to consistent bias in the computation of the transforms $T_j$-$T_o$, and its exact form may vary depending upon the techniques used to generate the transforms.

Figure 5B:
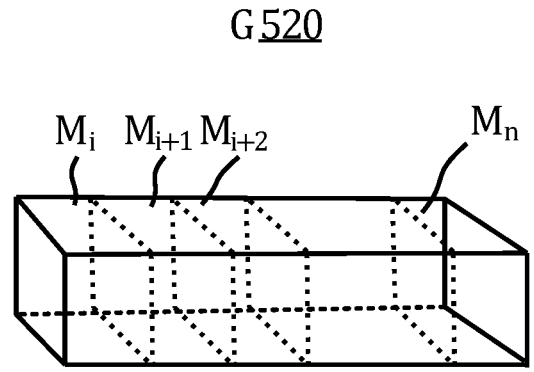
FIG. 5B illustrates an example global map after error correction of the transforms, according to one embodiment.

FIG. 5B illustrates an example global map G after error correction of the transforms, according to one embodiment. The transform module 140 corrects this error on a transform by transform basis by using the labeled plant features and their corresponding clusters within the global map. In one embodiment, this is accomplished by using the depth of the clusters (by point in the cluster or in aggregate by cluster) as a function of the vehicle's 120 position (e.g., as a function of travel in the x dimension). Assuming the plants are planted roughly along a line (row) in the ground, these depths should be sufficiently constant (i.e., also a line in the x dimension) assuming the vehicle 120 is also traveling in a straight line. The transform module 140 may fit a line to this cluster depth data (again, either point by point or in aggregate by cluster) to identify the row line of the already-identified plant features. More complicated functions may be used if the row is irregular or if the vehicle 120 did not travel a straight line (e.g., piecewise function, spline or other set of functions).

In one specific embodiment, to correct a given transform $T_j$ between depth maps $D_i$ and $D_{i+1}$, the transform module 140 compares the row line depth as a function of position along the axis of travel (e.g., the x axis). For pixels and corresponding portion of the row line within each pair of depth map $D_i$ and $D_{i+1}$, the transform module 140 adjusts the transform $T_j$ by 1) negatively weighting change in depth of the pixels ($z_{i+1}-z_i$) based on the row line, scaled based on the speed of the vehicle, 2) negatively weighting the rate of change of the depth of the pixels ($\Delta(z_{i+1}-z_t)-\Delta(z_t-z_{i-1})$) based on the row line, and 3) positively weighting pixels that have a high probability prob and that are further from the row line (e.g., using a hamming window or cosine value). This third factor is oppositely weighted to the first two, because although the first two factors suggest an erroneous change in depth due to transform error, the third instead indicates that the row line itself should be updated based on the newly identified depth in the current image/heatmap, usually representing a plant feature that truly is located further away from the row line from the previous plant features.

The transform module 140 may perform this correction on a transform by transform basis while the system is processing each image, or alternatively this process may be performed after heatmaps, cluster sets, and plant features have been identified and labeled. In this latter case, the same three considerations are used and a statistical regression may be performed to identify a global optical for the row line depth. All transforms may then be adjusted using this row line as a baseline for the depth dimension of the transforms.

IV. Crop Image Analysis System—Ray Line Implementation

IV.A. Process Introduction

Figure 6:
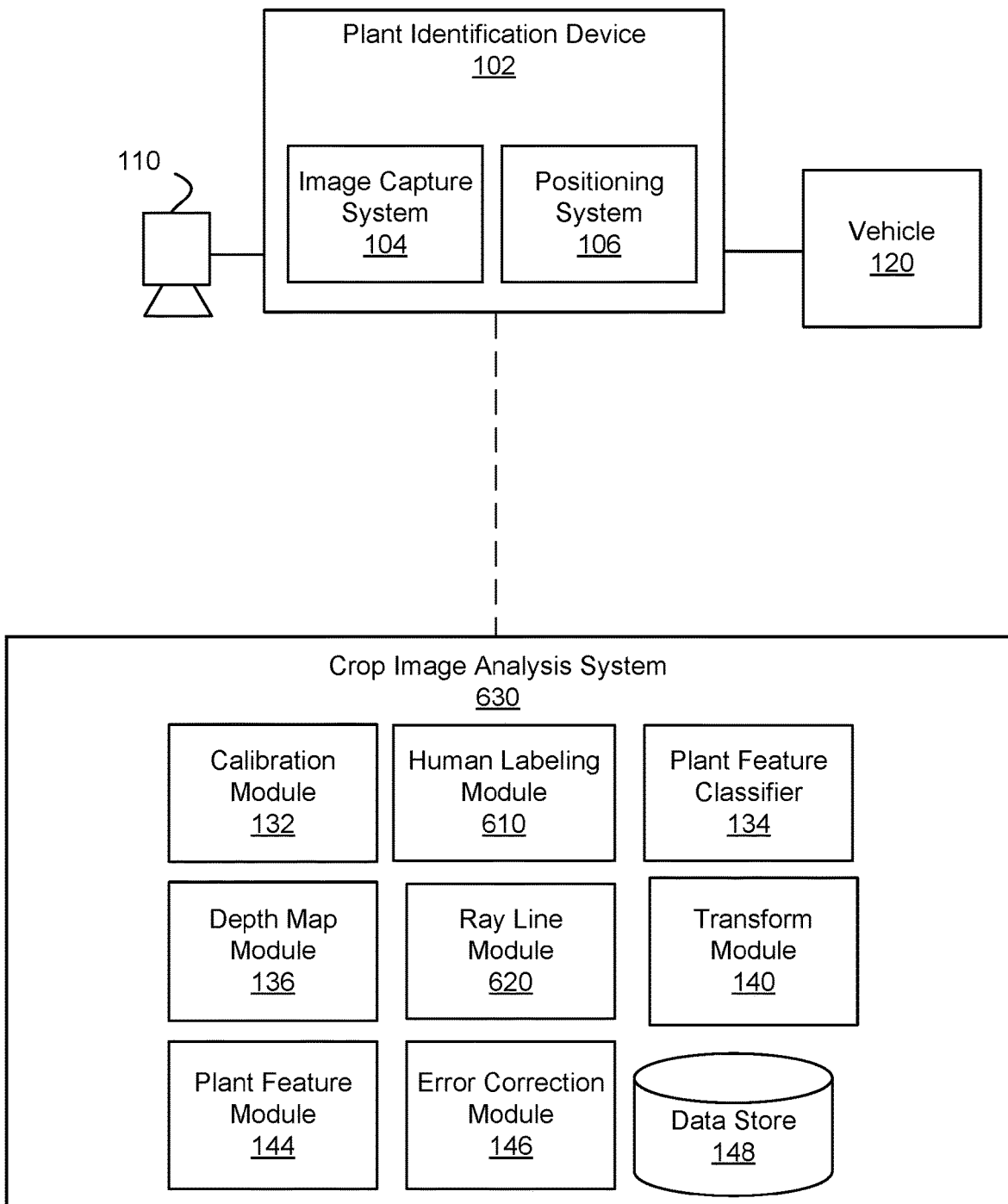
FIG. 6 is an alternative block diagram of an environment in which ray line clustering can be used to identify plant features, according to one embodiment.
Figure 7:
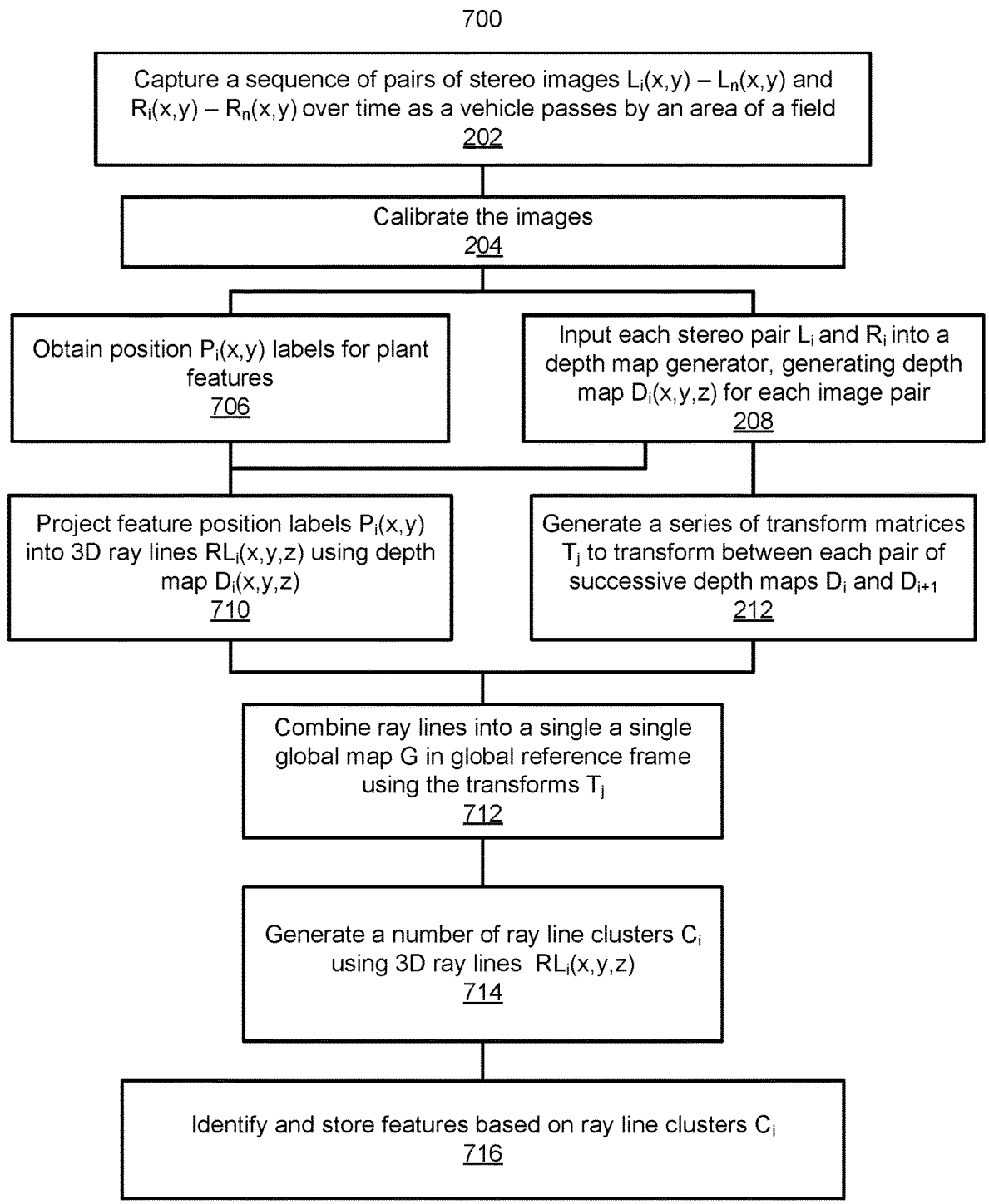
FIG. 7 is an example process for using ray line clustering to identify plant features, according to one embodiment.

FIG. 6 is an alternative block diagram of a combined system 600 for capturing images that can be used to identify plant features, according to one embodiment. FIG. 7 is an example process for using ray line clustering to identify plant features, according to one embodiment. In the embodiment of FIGS. 6 and 7, many of the components of the system 630 are the same as for the implementation described with respect to FIGS. 1-5B. However, in place of the combined map module 138 and point cluster module 142, a human labeling module 610 and a ray line module 620 are used instead.

Some aspects of the ray line implementation are similar to those of the classifier implementation. Similarly to the prior implementation, the device 102 captures images 202 and passes them to system 630 for calibration 204 by module 132 as described previously. Also similarly to the prior implementation, The transform module 140 is also called 410 to generate transforms $T_j$-$T_m$ between the depth maps $D_i$-$D_n$ of the sequential images in the sequence.

Also similarly to the previous implementation, the error correction module 146 may be called 410 to remove any error in the transforms that builds across the images in the sequence, for example based on a row line that is determined based on the positions of labeled plant features detected in the images.

In the ray line implementation, the images are used to identify 706 particular pixels in the images that are associated with plant features. System 630 may use different techniques to determine these pixels, and which technique is used may vary by implementation. In one embodiment, the classifier 134 is used to identify the pixels. In this embodiment, the classifier 134 outputs a list of pixels $P_i(x,y)$ that are determined to be associated with a plant feature. This data is stored in data store 148. This may be accomplished, for example, by operating the classifier 134 as described previously, and then selecting for output only those pixels $P_i(x,y)$ that have a probability value prob above a threshold value, however in practice a different classifier entirely may be used instead. In another embodiment, human labeled input is obtained to identify the pixels associated with plant features. This is described in the next subsection, IV. B.

IV.B. Human Labeling Input

The human labeling module 610 has human users at client computer terminals (not shown) label 706 the occurrence and pixel position (x/y) of any plant features in the images, and is one means for doing so. Module 610 accomplishes this by receiving the calibrated images left $L_i(x,y)$-$L_n(x,y)$ or right images $R_i(x, y)$-$R_n(x, y)$ from the calibration module 132 and providing them through a graphical user interface (GUI) to multiple client computers having graphical displays. These client computers are used by many separate human users, who will be presented with many of the calibrated images, and asked to label the positions of any plant features they see. One way to design such a program is using Amazon's™ Mechanical Turk™ computer software.

The client computer terminals report back human user input regarding the occurrence and pixel positions of the plant features $P_i(x,y)$ back to the human labeling module 610 for each image i. For example, human users may click and mark the location within an image displayed on a screen as including a plant feature. The marked pixels then would be reported to module 610. Each image from a given sequence may be presented to multiple users. Further, as above multiple images from the same sequence may have captured the same plant as the vehicle 120 travels along a row of crops. As a result, the human labeled data from the client computer terminals may have, for each actual plant present in the field, many different possible labeled pixels for positions of plant features reported from more than one image in the sequence. The human labeling module 610 aggregates this data and stores in the data store 148.

IV.C. Ray Line Projection

The ray line module 620 processes the human labeled data across multiple images to identify groups of labeled pixels across multiple images that all correspond to the same plant features, and is one means for doing so.

The ray line module 620 receives the human labeled data and uses a depth map $D_i(x,y,z)$ provided 208 by the depth map module 136 to project 710 the human labeled data from two dimensions $P_i(x,y)$ to three dimensions $RL_i(x,y,z)$. These three dimensional projections are referred to as "rays" or "ray lines" because it is possible to trace a ray along the point of view of the observer, starting from the location at the center of the camera 110 at the position in the field where the camera 110 captured the image through to the position (x/y/z) of the labeled pixel. Each of these rays represents a possible plant feature. As multiple images from different positions in the field will often have labeled pixels that correspond to the same feature, across multiple images in the sequence these rays will have different starting points (different camera positions) but will appear to intersect or come close to intersecting.

Figure 8:
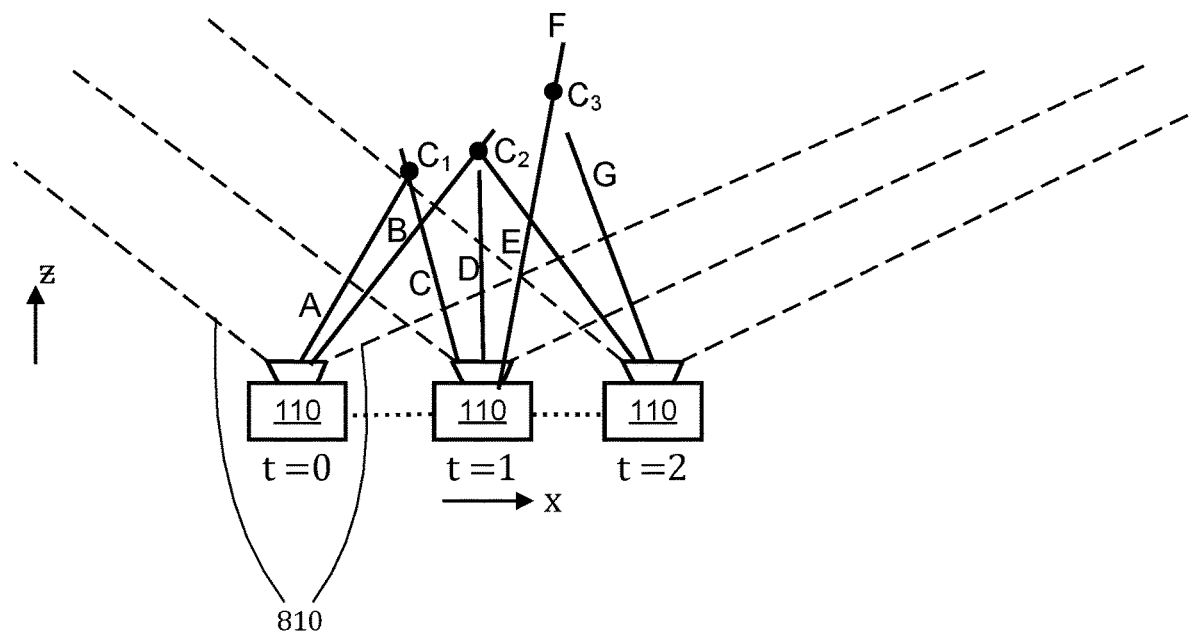
FIG. 8 is an example illustration of projected ray line data, according to one embodiment.

FIG. 8 is an example illustration 800 of projected ray line data, according to one embodiment. As the vehicle 120 and camera 110 travels along the row (x) and captures images at successive instances in time, the area captured in each image changes. Generally, the field of view 810 of the camera 110 remains fixed, however this is not strictly necessary. Ray lines A-G represent examples of pixels from images captured at three separate time intervals that have been human labeled as containing or representing plant features of plants and which have been projected to add a depth (z) dimension based on a depth map. FIG. 8 is a two dimensional image, and thus from the illustrated perspective it appears that many of these ray lines overlap, however in practice in three dimensions ray lines will exactly overlap infrequently if ever. The ray line module 620 uses the overlap or near overlap of ray lines to identify clusters of ray lines that together signify the presence of a plant feature. Examples of clusters that may be identified from these ray lines include example clusters $C_1$-$C_3$. Ray line clustering is described in the following subsections.

IV.D. Ray Line Clustering

The ray line module 620 is programmed to operate an algorithm that identifies 712 plant features and their positions by determining a set of ray line clusters $C_i$ based on the intersection or near intersection of ray lines $RL_i(x,y,z)$ from a sequence of images, and is one means for doing so. The algorithm is a global, iterative algorithm, in that it assigns some or all of the rays to a cluster with other rays, and determines a measure of fit of that particular solution. The algorithm is iteratively run using the measure of fit as a guide to help improve the assignment of rays to cluster. Not all rays need to be assigned to clusters, some data may be erroneous and may be omitted rather than assigned to a cluster.

In one embodiment, this algorithm determines a distance between each pair of ray lines in three dimensional space that are under consideration as being representative of the same candidate plant feature. In making a determination about whether two ray lines are associated with the candidate plant feature, the algorithm attempts to minimize the distances between the ray lines when grouping the ray lines into clusters $C_i$. The greater the distance between the ray lines, the lower the likelihood that the ray lines are associated with the same plant feature.

The algorithm may further express a preference for creating fewer, larger in ray count clusters rather than more, lower in ray count clusters. This may be expressed in the algorithm as a bias or added weighting towards adding a given ray line to one cluster vs. another based on the number of rays already associated each cluster as the algorithm iterates through assigning rays to clusters. One assumption to this constraint is that fewer clusters correlates with a lower complexity model, fitting the real world representation better. Another assumption to this constraint on the algorithm is that generally, not that many plant features will actually present in a given image, as not many plants are captured in each image, although this may vary based on the size of the plants and the distance of the camera 110 from the plants. Thus, designing the algorithm to preference fewer clusters matches the expected data better over the long run.

The algorithm may further have a restriction that ray lines extending from the same starting point (e.g., same image) cannot intersect, that is they cannot be clustered as being associated with the same plant feature.

The algorithm may further have a restriction that ray lines may not be considered for association with a candidate plant feature unless they terminate at a depth (z) a sufficient minimum or maximum distance from the camera 110, an assumption being that crops are generally planted linearly along a row which will generally be within a certain range of depth from the camera, and that labeled pixels that are too close or too far from that line are most likely errors due to improper human labeling.

IV.E. Output

The ray line module 620 outputs and stores 714 a set of labeled plant features and their three dimensional positions based on the ray line clusters $C_i$. The position of the plant features may be stored according to a frame of reference of one of the images, a neutral frame of reference, or according to a geo-located position using external data. The labeled plant features are stored in data store 148, along with a correlation to the cluster of rays that were used to identify the plant feature. Other data may also be stored, such as the ray line clusters $C_i$ associated with each identified plant feature, the ray lines $RL_i(x,y,z)$ used to generate the cluster, the human labeled positions $P_i(x,y)$ and depth maps $D_i(x,y,z)$ used to generate the rays from the depth map module 136, and the transforms $T_i$ generated by the transform module 140 along with any error correction that was performed.

V. Using Plant Features

Figure 9:
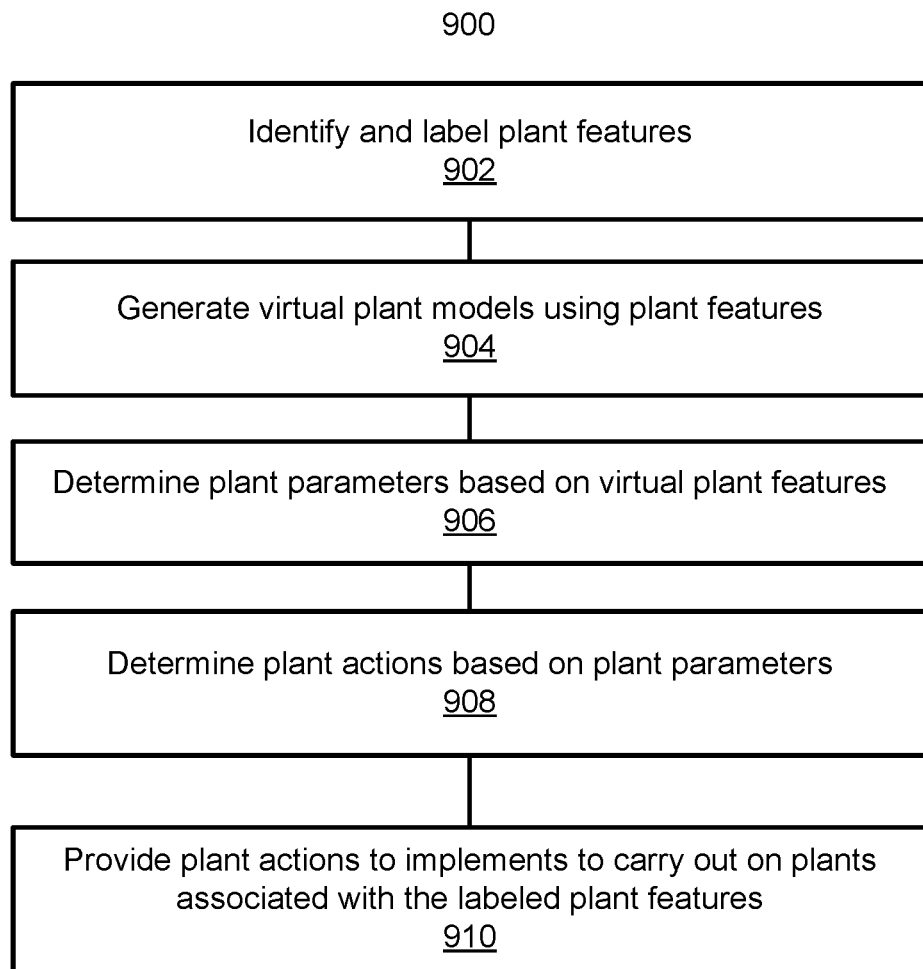
FIG. 9 is an example process for using labeled plant features to carry out actions with respect to the plants associated with the labeled plant features, according to one embodiment.

FIG. 9 is an example process 900 for using labeled plant features to carry out actions with respect to the plants associated with the labeled plant features, according to one embodiment. As discussed in the overview, once the positions of the plant features are known 902 (or once a combined map has been generated that includes information regarding the location of the plant features), other analyses or processes may be carried out based on the information. These include, for example, generating three-dimensional models of plants growing in the field, assessing plant growth and phenotypic features, determining what kinds of treatments to apply including both where to apply the treatments and how much, determining whether to remove weeds or other undesirable plants, and so on. For example, the position in the field of plant features specifically, and thus each individual plant, can be the starting point for performing any of these processes on a plant-by-plant basis.

As one exemplary embodiment, FIG. 9 illustrates that the locations of the plant features may be passed as an input to plant modeling computer code. The plant modeling code may, for example, use any generated depth maps, heat maps, combined maps, and/or global maps to generate 904 or "grow" plant a virtual model of one or more plants in a field using the locations of the plant features as a starting point for each separate plant to be modeled. In one embodiment, the virtual model is a skeleton model having different segments for each of the parts of the plant, such a stalk, branches, and leaves. The code generates a virtual model of a real plant, a portion of a real plant field, and/or the entirety of the real plant field. In a specific example, the code builds a virtual model of a corn field, wherein the virtual model includes a virtual structure for all or most of the detected corn plants within the corn field.

The virtual model is accessed by plant analysis computer code that analyzes 906 the virtual model to identify parameters of individual plants, and/or aggregate statistics regarding the modeled plants. Aggregate statistics may be generated for a plant and a subset of its nearest neighbors, an entire row of plants, an entire field of plants, or any sub-zone thereof. Examples of aggregate parameters that may be identified include plant density, a number of plants within the plant field, plant size (e.g., average height, median height, height distribution), and plant uniformity, and terminal yield. Examples of individual plant parameters include biomass, uniformity, leaf area or volume, susceptibility to nutrient, water, or biotic stress, leaf area, stalk diameter, height, and terminal yield on a plant-by-plant basis.

The individual or aggregate plant parameters are accessed by plant action computer code that analyzes 908 the parameters to determine what action to take with respect to the plants in the field. These determinations may be made on the basis of parameters of individual plants, such that separate and different action can be taken on each individual plant in the field. These determinations may also be made on the basis of aggregate parameters of more than one plant, such as the parameters of a plant and its nearby neighbors, or in aggregate across an entire row, field, or any sub-zone thereof.

The determined actions 908 may include potential treatments, such as the application of fertilizer, pesticides or other chemicals. The determined actions 908 may also include thinning practices, such as the removal of plants identified as weeds, or thinning to remove undesired plants.

The determined actions may be provided 910 to a physical implement (not shown) attached to the device 102 or vehicle 120, to carry out the determined action. For example, if the determined action is a chemical application, the provided action may include timing of when to spray, what chemical to spray, how much to spray, for how long, and at what flow rate. The implement may then carry out 910 the determined action. Alternatively, in an embodiment where the device that will carry out the action is physically remote or otherwise separate from the device 102/system 130 determining the action to be taken, the providing step may include transmitting the determined action from one device/system to another. This may be a wired or wireless transmission, according to any known transmission protocol, such as by radio frequency transmission (e.g., WiFi, Bluetooth), infra-red transmission, Ethernet or CAN bus transmission, etc.

In one embodiment, all of the process steps of FIG. 9 can be performed in real or near-real time. For example, the method can be performed as the device 102/vehicle 120/drone etc. travels along a row of the field. The camera 110 may capture images, which may be passed to an onboard system 130 to identify the plant features 902, model plants 904, identify parameters 906, and determine actions 908, and provide 910 those actions to an implement of the vehicle 120. All steps 902-910 are capable of being performed in a time between when the cameras 110 capture the images of the plants for whom action 908 is to be determined, and when the implement to carry out those action passes by those same plants along the field. For example, in various embodiments, the vehicle may be traveling at a speed between 1 and 20 miles per hour, and the camera may be capturing images at a frequency within an order of magnitude of 30 Hertz. Given the length of the device 102 or vehicle 120, the physical distance between the cameras 110 and the implement that performs the action may be approximately a foot, and/or within an order of magnitude of a foot. As a consequence, the process of FIG. 9 can be carried out before the vehicle travels the distance between the cameras 110 and the implement. This means that the device 102, system 130, and vehicle 120 can completely carry out the steps illustrated in FIG. 9 in a time range between 40 and 100 milliseconds. This entirely eliminates the need for offboard processing, and allows action while the vehicle 120 is in the field, rather than requiring a first pass to identify what to do, and a second pass to actually do it.

In another embodiment, the process of FIG. 9 can be carried out over different time periods. For example, image collection by the cameras may occur during a first time period as the device 102 travels through the field. Plant feature detection 902, and the other processing steps 902-908 may occur over a second time period later in time, such as in an office or away from the field. The action to be taken 910 may be performed during a third time, such as when the same or a different device 102/vehicle 120 travels through the field to carry out the action.

VI. Additional Considerations

The computer program code and modules implementing the functionality of system 130 are not native components of underlying machine or system, and thus extend the operations and functionality thereof beyond their generic functions and capabilities. Those of skill in the art will appreciate that data stores, databases, information, and data structures described herein are not components of a generic database, and system 130 may contain other databases that are not explicitly mentioned here. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Upon reading this disclosure, those of skill in the art will appreciate still additional alternative structural and functional designs for a system for identifying the positions of plant features from captured images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the methods and apparatuses disclosed herein.

VII. Example Ray Line Clustering Pseudocode

The following C++ code illustrates one example implementation of at least some of the code for implementing the ray line module 620. The C++ code includes a class called "ray line clustering." It implements the algorithm described above, including the four constraints already mentioned in the previous subsection.

```cpp
#include <Eigen/Core>
#include <iostream>
namespace BRT {
namespace ML {
class rayLineClustering
{
public:
    rayLineClustering(Eigen::MatrixXd distanceMatrix,
    std::vector<double> depth, std::vector<int> rayFrames )
    :
    _distanceMatrix(distanceMatrix),
    _depth(depth),
    _rayFrames(rayFrames),
    _graph(distanceMatrix.rows( ),
    distanceMatrix.cols( ) ),
    _iteration (0)
    { }
    std::vector<std::vector<int> > returnPartitionGraph(double
    cuttoff_=0.00000001,double iterationCuttoff_=300);
private:
    Eigen::MatrixXd _distanceMatrix;
    // intermediate
    Eigen::MatrixXd _graph;
    std::vector<double> _depth;
    std::vector<int> _rayFrames;
    int _iteration;
    // steps
    void converge(double cutoff_, double iterationCuttoff_);
    void initializeGraph( );
    void normalizeGraph( );
    void expandColumn( );
    double findMedianDepth( );
    void reinforceDepth(double depth, double sigma=0.1);
    void inflateRow(double factor=1.0);
    long double difference(Eigen::MatrixXd input_);
};
} // ML
} // BRT
#endif
// RAYLINECLUSTERING_H
#include "plot_consolidation_ray_line.hpp"
#include <unsupported/Eigen/MatrixFunctions>
#include <math.h>
#include <algorithm>
namespace BRT {
namespace ML {
```

```
void rayLineClustering::converge(double cuttoff_, double
iterationCuttoff_)
{
    // loop through until the matrix converges
    _iteration = 0;
    long double diff;
    do{
        Eigen::MatrixXd temp = _graph;
        inflateRow(2);
        expandColumn( );
        diff = difference(temp);
        std::cout << "difference at step " << _iteration << " is
"<< diff << std::endl;
        _iteration += 1;
    } while( diff > cuttoff_ && _iteration < iterationCuttoff_
);
}
std::vector<std::vector<int> >
rayLineClustering::returnPartitionGraph(double cuttoff_, double
iterationCuttoff_)
{
    // loop through the first time to get depths
    initializeGraph ( );
    std::cout << "Partition Graph" << std::endl;
    converge(cuttoff_,iterationCuttoff_);
    // reinforce depth and do a second iteration
    std::cout << "incorporate depth" << std::endl;
    double medianDepth = findMedianDepth( );
    initializeGraph( );
    reinforceDepth(medianDepth,0.1);
    converge (cuttoff_,iterationCuttoff_);
    // find the connections
    std::vector<int> addedRays;
    std::vector<std::vector<int> > connections;
    for ( int row = 0; row < _graph.rows( ); row++ )
    {
        // find ray point connections
        std::vector<int> rays;
        for( int col = 0; col < _graph.cols( ); col++ )
        {
            if( _graph(row,col) > 0.01 )
            {
                // has not already been added
                if(std::find(addedRays.begin( ),addedRays.end( ),c
ol) == addedRays.end( ) )
                {
                    rays.push_back(col);
                    addedRays.push_back(col);
                }
                else {
                    std::cerr << "ray " << col << " has been
                    added twice in ray line combination" <<
                    std::endl;
                }
            }
        }
        std::sort(rays.begin( ),rays.end( ) );
        connections.push_back(rays);
    }
    int count = 0;
    for( std::vector<int> con: connections ) {
        if( con.size( ) > 0 )
        {
            std::cout << "cluster " << count++ << " has rays ";
            for( int ind: con )
                std::cout << " " << ind;
            std::cout << std::endl;
        }
    }
    return connections;
}
void rayLineClustering::initializeGraph( )
{
    // fill in the inverse values of distance to show a strong
    //connection/flow
    for( int row = 0; row < _distanceMatrix.rows( ); row++ ) {
        for( int col = 0; col < _distanceMatrix.cols( ); col++ )
        {
            _graph(row,col) = std::max( 0.1 -
            _distanceMatrix(row,col), 0.0);
        }
    }
    // zero out values of rays from the same frame, that are not
    //the highest in that frame on a point
    if( _rayFrames.size( ) == _graph.cols( ) )
    {
        for( int col = 0; col < _graph.cols( ); col++ )
        {
            for( int row = 0; row < _graph.rows( ); row++ )
            {
                // find biggest value in row with same frames
                double biggestGraphValue = _graph(row,col);
                for( int colInside = 0; colInside <
                _graph.cols( ); colInside++ ) {
                    if( _rayFrames[colInside] == _rayFrames[col]
                    && _graph(row,colInside) > biggestGraphValue
                    ) {
                        biggestGraphValue =
                        _graph(row,colInside);
                    }
                }
                // zero out values that were not the biggest
                for( int colInside = 0; colInside <
                _graph.cols( ); colInside++ ) {
                    if( _rayFrames[colInside] == _rayFrames[col]
                    && graph(row,colInside) <
                    biggestGraphValue)
                    {
                        _graph(row,colInside) = 0;
                    }
                }
            }
        }
    }
    else {
        std::cerr << "no data for neighboring frames to not be on
        same point" << std::endl;
    }
}
void rayLineClustering::normalizeGraph( )
{
    //fill in the inverse values of distance to show a strong
    //connection/flow
    for( int col = 0; col < _graph.cols( ); col++ )
    {
        double colSum = _graph.col(col).sum( );
        for( int row = 0; row < _graph.rows( ); row++ )
        {
            _graph(row,col) /= colSum;
        }
    }
}
// drives 1 connection per ray
void rayLineClustering::expandColumn( )
{
    // fill in the inverse values of distance to show a strong
    // connection/flow
    for( int col = 0; col < _graph.cols( ); col++ )
    {
        double colSquare = _graph.col(col).array( ).square( ).sum( );
        for( int row = 0; row < _graph.rows( ); row++ )
        {
            _graph(row,col) = _graph(row,col) * _graph(row,col) /
            colSquare;
        }
    }
}
double rayLineClustering::findMedianDepth( )
{
    // find the average depth
    std::vector<double> bestDepth;
    for( int col = 0; col < graph.cols( ); col++ )
    {
        double colDepth = 0;
        double colSum = _graph.col(col).sum( );
        for( int row = 0; row < _graph.rows( ); row++ )
        {
            colDepth += _graph(row,col)*_depth[row];
```

-continued

```
    }
    bestDepth.push_back(colDepth/colSum);
}
// find median
double median;
size_t size = bestDepth.size( );
std::sort(bestDepth.begin( ), bestDepth.end( ) );
if (size % 2 == 0)
{
    median = (bestDepth[size / 2 - 1] + bestDepth+size / 2])
    / 2;
}
else {
    median = bestDepth[size / 2];
}
return median;
}
// drives 1 connection per ray
void rayLineClustering::reinforceDepth(double depth, double
sigma)
{
    normalizeGraph( );
    // weight values based on the bestDepth
    for( int row = 0; row < _graph.rows( ); row++ )
    {
        double pointDepthWeight = std::exp(-pow(depth-
        _depth[row],2) / (2*sigma*sigma) );
        for( int col = 0; col < _graph.cols( ); col++ )
        {
            _graph(row,col) *= pointDepthWeight;
        }
    }
    normalizeGraph( );
}
// drives to minimize # of points
void rayLineClustering::inflateRow(double factor)
{
    // fill in the inverse values of distance to show a strong
    // connection/flow
    for( int row = 0; row < _graph.rows( ); row++ )
    {
        double rowSum = pow(_graph.row(row).sum( ),factor);
        for( int col = 0; col < _graph.cols( ); col++ )
        {
            _graph(row,col) *= rowSum;
        }
    }
}
long double rayLineClustering::difference(Eigen::MatrixXd
input_)
{
    return (input_-_graph).squaredNorm( );
}
} // ML
} // BRT
```

What is claimed is:

1. A method for generating a global depth map representing a field comprising a plurality of plants:
capturing, using an image acquisition system of a farming machine travelling through the field, a plurality of images of the field, each image including pixels comprising information describing plant features in the image, and distances between objects in the field and the farming machine;
classifying, using a plant feature identification model, pixels in the plurality of images as plant features of a plurality of plant features;
generating, using a depth map generation model and classified features in the plurality of images, a plurality of depth maps quantifying distances between classified plant features and the farming machine;
identifying, for the plurality of depth maps, classified plant features that occur in two or more depth maps of the plurality of depth maps as global plant features of a plurality of global plant features;
generating a global depth map describing locations of plant features in the field by combining depth maps of the plurality of depth maps comprising global plant features; and
treating plants in the field based on locations of plant features in the global depth map.

2. The method of claim 1, wherein classifying features using the plant feature identification model further comprises:
for each image in the plurality of images:
determining a probability that each pixel in the image represents a plant feature of the plurality of plant features; and
classifying pixels in the image as the plant feature based on the probability the pixel represents the plant feature.

3. The method of claim 1, wherein generating the plurality of depth maps using the depth map generation model further comprises:
for each image of the plurality of images:
identifying pixels in the image classified as a plant feature;
calculating a distance between the plant feature and the farming machine; and
generating a depth map corresponding to the image comprising the distance between the plant feature and the farming machine.

4. The method of claim 1, wherein generating the global depth map comprises:
applying a global coordinate system to the plurality of depth maps; and
for each classified plant feature, assigning a probability that the plant feature occurs at a coordinate in the global coordinate system.

5. The method of claim 1, wherein generating the plurality of depth maps comprises:
accessing, from a positioning system of the farming machine, a location of the farming machine in the field;
determining distances between classified plant features and the farming machine; and
determining locations of classified plant features in the field based on the determined distances between the plant features and the farming machine and the location of the farming machine in the field.

6. The method of claim 1 wherein the farming machine comprises spray treatment mechanisms, the method further comprising:
determining a spray treatment for a classified plant feature based on characteristics of the classified plant feature; and
actuating a spray treatment mechanism to treat the classified plant feature as the farming machine travels through the field.

7. The method of claim 1, further comprising:
for each image in the plurality of images,
identifying, in the image, a cluster of pixels classified as a plant feature of the plurality of plant features; and
determining the cluster of pixels represents a plant based on probabilities each pixel in the cluster represents the classified plant feature.

8. A non-transitory computer readable storage medium comprising computer program instructions for generating a global depth map representing a field that, when executed by one or more processors, cause the one or more processors to:

capture, using an image acquisition system of a farming machine travelling through the field, a plurality of images of the field, each image including pixels comprising information describing plant features in the image, and distances between objects in the field and the farming machine;

classify, using a plant feature identification model, pixels in the plurality of images as plant features of a plurality of plant features;

generate, using a depth map generation model and classified features in the plurality of images, a plurality of depth maps quantifying distances between classified plant features and the farming machine;

identify, for the plurality of depth maps, classified plant features that occur in two or more depth maps of the plurality of depth maps as global plant features of a plurality of global plant features;

generate a global depth map describing locations of plant features in the field by combining depth maps of the plurality of depth maps comprising global plant features; and treat plants in the field based on locations of plant features in the global depth map.

9. The non-transitory computer readable storage medium of claim 8, wherein classifying features using the plant feature identification model further causes the one or more processors to:

for each image in the plurality of images:
determine a probability that each pixel in the image represents a plant feature of the plurality of plant features; and
classify pixels in the image as the plant feature based on the probability the pixel represents the plant feature.

10. The non-transitory computer readable storage medium of claim 8, wherein generating the plurality of depth maps using the depth map generation model further causes the one or more processors to:

for each image of the plurality of images:
identify pixels in the image classified as a plant feature;
calculate a distance between the plant feature and the farming machine; and
generate a depth map corresponding to the image comprising the distance between the plant feature and the farming machine.

11. The non-transitory computer readable storage medium of claim 8, wherein generating the global depth map further causes the one or more processors to:

apply a global coordinate system to the plurality of depth maps; and
for each classified plant feature, assign a probability that the plant feature occurs at a coordinate in the global coordinate system.

12. The non-transitory computer readable storage medium of claim 8, wherein generating the plurality of depth maps further causes the one or more processors to:

access, from a positioning system of the farming machine, a location of the farming machine in the field;
determine distances between classified plant features and the farming machine; and
determine locations of classified plant features in the field based on the determined distances between the plant features and the farming machine and the location of the farming machine in the field.

13. The non-transitory computer readable storage medium of claim 8, wherein the farming machine comprises spray treatment mechanisms, further comprising:

determine a spray treatment for a classified plant feature based on characteristics of the classified plant feature; and
actuate a spray treatment mechanism to treat the classified plant feature as the farming machine travels through the field.

14. The non-transitory computer readable storage medium of claim 8, wherein the computer program instructions, when executed, further cause the processor to:

for each image in the plurality of image,
identify a cluster of pixels classified as a plant feature of the plurality of plant features in the image; and
determine the cluster of pixels represents a plant based on probabilities each pixel in the cluster represents the classified plant feature.

15. A farming machine comprising:
an image acquisition system configured to capture images of plants as the farming machine travels through a field;
a treatment system configured to treat plants in the field;
one or more processors; and
a non-transitory computer readable storage medium comprising computer program instructions for generating a global depth map representing the field that, when executed by the one or more processors, cause the one or more processors to:

capture, using the image acquisition system, a plurality of images of the field, each image including pixels comprising information describing plant features in the images, and distances between objects in the field and the farming machine;

classify, using a plant feature identification model, pixels in the plurality of images as plant features of a plurality of plant features;

generate, using a depth map generation model and classified features in the plurality of images, a plurality of depth maps quantifying distances between classified plant features and the farming machine;

identify, for the plurality of depth maps, classified plant features that occur in two or more depth maps of the plurality of depth maps as global plant features of a plurality of global plant features;

generate a global depth map describing locations of plant features in the field by combining depth maps of the plurality of depth maps comprising global plant features; and treat, using the treatment system, plants in the field based on locations of plant features in the global depth map.

16. The farming machine of claim 15, wherein classifying features using the plant feature identification model further causes the one or more processors to:

for each image in the plurality of images:
determine a probability that each pixel in the image represents a plant feature of the plurality of plant features; and
classify pixels in the image as the plant feature based on the probability the pixel represents the plant feature.

17. The farming machine of claim 15, wherein generating the plurality of depth maps using the depth map generation model further causes the one or more processors to:

for each image of the plurality of images:
identify pixels in the image classified as a plant feature;
calculate a distance between the plant feature and the farming machine; and
generate a depth map corresponding to the image comprising the distance between the plant feature and the farming machine.

18. The farming machine of claim 15, wherein generating the global depth map further causes the one or more processors to:
- apply a global coordinate system to the plurality of depth maps; and
- for each classified plant feature, assign a probability that the plant feature occurs at a coordinate in the global coordinate system.

19. The farming machine of claim 15, wherein generating the plurality of depth maps further causes the one or more processors to:
- access, from a positioning system of the farming machine, a location of the farming machine in the field;
- determine distances between classified plant features and the farming machine; and
- determine locations of classified plant features in the field based on the determined distances between the plant features and the farming machine and the accessed location of the farming machine in the field.

20. The farming machine of claim 15, wherein the farming machine comprises spray treatment mechanisms, further comprising:
- determine a spray treatment for a classified plant feature based on characteristics of the classified plant feature; and
- actuate a spray treatment mechanism to treat the classified plant feature as the farming machine travels through the field.

* * * * *